United States Patent
Sun et al.

(10) Patent No.: US 10,714,967 B2
(45) Date of Patent: Jul. 14, 2020

(54) AUTOMOTIVE GENERATOR CONTROL METHOD AND DEVICE

(71) Applicant: GUANGZHOU AUTOMOBILE GROUP CO., LTD., Guangzhou, Guangdong (CN)

(72) Inventors: Ruixue Sun, Guangdong (CN); Qingpeng Su, Guangdong (CN); Kaichang Lai, Guangdong (CN); Zhixin Zeng, Guangdong (CN); Anwei Zhang, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 107 days.

(21) Appl. No.: 16/303,155

(22) PCT Filed: Jun. 28, 2017

(86) PCT No.: PCT/CN2017/090475
§ 371 (c)(1),
(2) Date: Nov. 20, 2018

(87) PCT Pub. No.: WO2018/010544
PCT Pub. Date: Jan. 18, 2018

(65) Prior Publication Data
US 2019/0305582 A1 Oct. 3, 2019

(30) Foreign Application Priority Data
Jul. 14, 2016 (CN) .......................... 2016 1 0562455

(51) Int. Cl.
*H02J 7/14* (2006.01)
*B60W 10/08* (2006.01)
(Continued)

(52) U.S. Cl.
CPC .......... *H02J 7/1492* (2013.01); *B60W 10/08* (2013.01); *B60W 40/105* (2013.01);
(Continued)

(58) Field of Classification Search
CPC .. H02J 7/1492; B60W 40/105; B60W 50/038; B60W 20/12; B60W 10/08; B60W 2050/0013
(Continued)

(56) References Cited

U.S. PATENT DOCUMENTS

2015/0005975 A1* 1/2015 Di Cristofaro ....... H02J 7/1492
700/297
2015/0046010 A1* 2/2015 Wakashiro ............ B60W 20/12
701/22

FOREIGN PATENT DOCUMENTS

CN          102916478 A      2/2013

OTHER PUBLICATIONS

International Search Report of PCT Patent Application No. PCT/CN2017/090475 dated Aug. 23, 2017.

* cited by examiner

*Primary Examiner* — Paul Dinh

(57) ABSTRACT

An automotive generator control method includes inputting a current vehicle speed, an actual battery level, an actual battery temperature and an engine operating efficiency (S11); calculating an optimal battery level by using a preset first mapping table, on a basis of the actual battery temperature and the current vehicle speed; taking a difference between the actual battery level and the optimal battery level as a target power-generation difference (S12); calculating a target power-generation voltage by using a preset second mapping table, on a basis of the target power-generation difference and the engine operating efficiency (S13); and outputting the target power-generation voltage (S14). The
(Continued)

automotive generator control method and control device can precisely control a power-generation voltage of a generator according to a current engine/vehicle working condition and a battery working condition, so as to achieve primary energy recovery of the generator in a highly efficient manner.

14 Claims, 9 Drawing Sheets

(51) Int. Cl.
    *B60W 40/105*     (2012.01)
    *B60W 50/038*     (2012.01)
    *H02P 9/44*     (2006.01)
    *B60W 50/00*     (2006.01)

(52) U.S. Cl.
    CPC ............. *B60W 50/038* (2013.01); *H02P 9/44* (2013.01); *B60W 2050/0013* (2013.01)

(58) Field of Classification Search
    USPC ....................................................... 320/134
    See application file for complete search history.

AUTOMOTIVE GENERATOR CONTROL METHOD AND DEVICE

FIELD OF THE INVENTION

The present invention relates to an automotive control technology and, more particularly to an automotive generator control method and a control device thereof.

BACKGROUND OF THE INVENTION

Currently, electric energy required in vehicles is supplied by the generator in the vehicle, and the generator is driven by the engine to generate and supply power. For supplying a backup power, a rechargeable battery is configured in the vehicle, which is charged by the generator.

However, inventors finds out the following drawbacks during study, first, the conventional engine management system and the conventional generator couldn't adjust the power-generation voltage, thus the generated energy is wasted and the fuel consumption is increased, furthermore, the rechargeable battery is deeply discharged to lower the lifetime of the battery, thereby the primary energy recovery of the generator can't be achieved.

SUMMARY OF THE INVENTION

One objective of the present invention is to provide an automotive generator control method, which can efficiently control a power-generation voltage of a generator on the basis of the current engine/vehicle working condition, or the battery working condition, so as to efficiently achieve primary energy recovery of the generator of the vehicle.

Another objective of the present invention is to provide an automotive generator control device, which can efficiently a control power-generation voltage of a generate on the basis of the current engine/vehicle working condition, or the battery working condition, so as to efficiently achieve primary energy recovery of the generator of the vehicle.

To achieve the above-mentioned objectives, an automotive generator control method of the present invention includes inputting a current vehicle speed, an actual battery level, an actual battery temperature and an engine operating efficiency which are acquired in real time; calculating an optimal battery level by using a preset first mapping table, on a basis of the actual battery temperature and the current vehicle speed; taking a difference between the actual battery level and the optimal battery level as a target power-generation difference; calculating a target power-generation voltage by using a preset second mapping table, on a basis of the target power-generation difference and the engine operating efficiency; and outputting the target power-generation voltage to control a generator to generate power.

As a preferable embodiment, the method further includes obtaining a battery aging curve correction value by using a preset third mapping table, on a basis of a predicted minimum battery voltage, and adding the battery aging curve correction value to the optimal battery level to obtain a corrected optimal battery level.

Said taking a difference between the actual battery level and the optimal battery level as a target power-generation difference includes taking a difference between the actual battery level and the corrected optimal battery level as a target power-generation difference.

As a preferable embodiment, said outputting the target power-generation voltage to control a generator to generate power includes limiting and adjusting the target power-generation voltage to acquire a final target power-generation voltage, on a basis of a preset maximum target voltage and a preset minimum target voltage; and outputting the final target power-generation voltage to control the generator to generate power.

As a preferable embodiment, the actual battery level and the actual battery temperature are acquired by a battery sensor and inputted through a LIN bus.

As a preferable embodiment, the method further includes taking a target power-generation difference replacement value that is preset as the target power-generation difference, once state accuracy of the battery sensor becomes poor or failure is generated on the LIN bus or the battery sensor.

As a preferable embodiment, the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

As a preferable embodiment, the first mapping table and the second mapping table are MAP diagrams.

Accordingly, an automotive generator control device of the present invention includes an input module, arranged for inputting a current vehicle speed, an actual battery level, an actual battery temperature and an engine operating efficiency which are acquired in real time; an optimal battery level calculating module, arranged for calculating an optimal battery level by using a preset first mapping table, on a basis of the actual battery temperature and the current vehicle speed; a target power-generation difference calculating module, arranged for taking a difference between the actual battery level and the optimal battery level as a target power-generation difference; a target power-generation voltage calculating module, arranged for calculating a target power-generation voltage by using a preset second mapping table, on a basis of the target power-generation difference and the engine operating efficiency; and an output module, arranged for outputting the target power-generation voltage to control a generator to generate power.

As a preferable embodiment, the device further includes an optimal battery level correction module, arranged for obtaining a battery aging curve correction value by using a preset third mapping table, on a basis of a predicted minimum battery voltage and adding the battery aging curve correction value to the optimal battery level to obtain a corrected optimal battery level.

Preferably, the target power-generation voltage calculating module is arranged for taking a difference between the actual battery level and the corrected optimal battery level as a target power-generation difference.

As a preferable embodiment, the output module includes a limiting and adjusting module, arranged for limiting and adjusting the target power-generation voltage, on a basis of a preset maximum target voltage and a preset minimum target voltage, thereby obtaining a final target power-generation voltage; and a final target power-generation voltage output module, arranged for outputting the final target power-generation voltage to control the generator to generate power.

As a preferable embodiment, a battery sensor module arranged for collecting the actual battery level and the actual battery temperature, and transmitting the actual battery level and the actual battery temperature to the input module through a UN bus.

As a preferable embodiment, the target power-generation voltage output module is further arranged for taking a target power-generation difference replacement value that is preset as the target power-generation difference, once state accuracy of the battery sensor becomes poor or failure is generated on the LIN bus or the battery sensor.

As a preferable embodiment, the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

As a preferable embodiment, the first mapping table and the second mapping table are MAP diagrams.

In comparison with the prior art, the automotive generator control method and the control device according to the present invention acquires the optimal battery level on the basis of the actual battery temperature and the current vehicle speed which are acquired in real time, takes the difference between the actual battery level and the optimal battery level as the target power-generation difference, and then calculates the target power-generation voltage on the basis of the target power-generation difference and the engine operating efficiency, thereby controlling the generator; as a result, the power-generation voltage of intelligent generator can be efficiently controlled and adjusted on the basis of the current engine/vehicle working condition and the battery working condition, so that energy consumption distribution management of the vehicle is optimized, primary energy recovery of the generator of the vehicle is efficiently achieved, and the lifetime of the battery is further extended. Moreover, the power-generation voltage of the intelligent generator is controlled accurately, thereby the accuracy of the generator is improved.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings. By all appearances, the embodiments to be described just are a part of embodiments of the present invention, not the all. Based on the embodiment of the present invention, all other embodiments obtained by the person ordinarily skilled in the art without any creative work pertain to the protection scope of the present invention.

Figure 1:
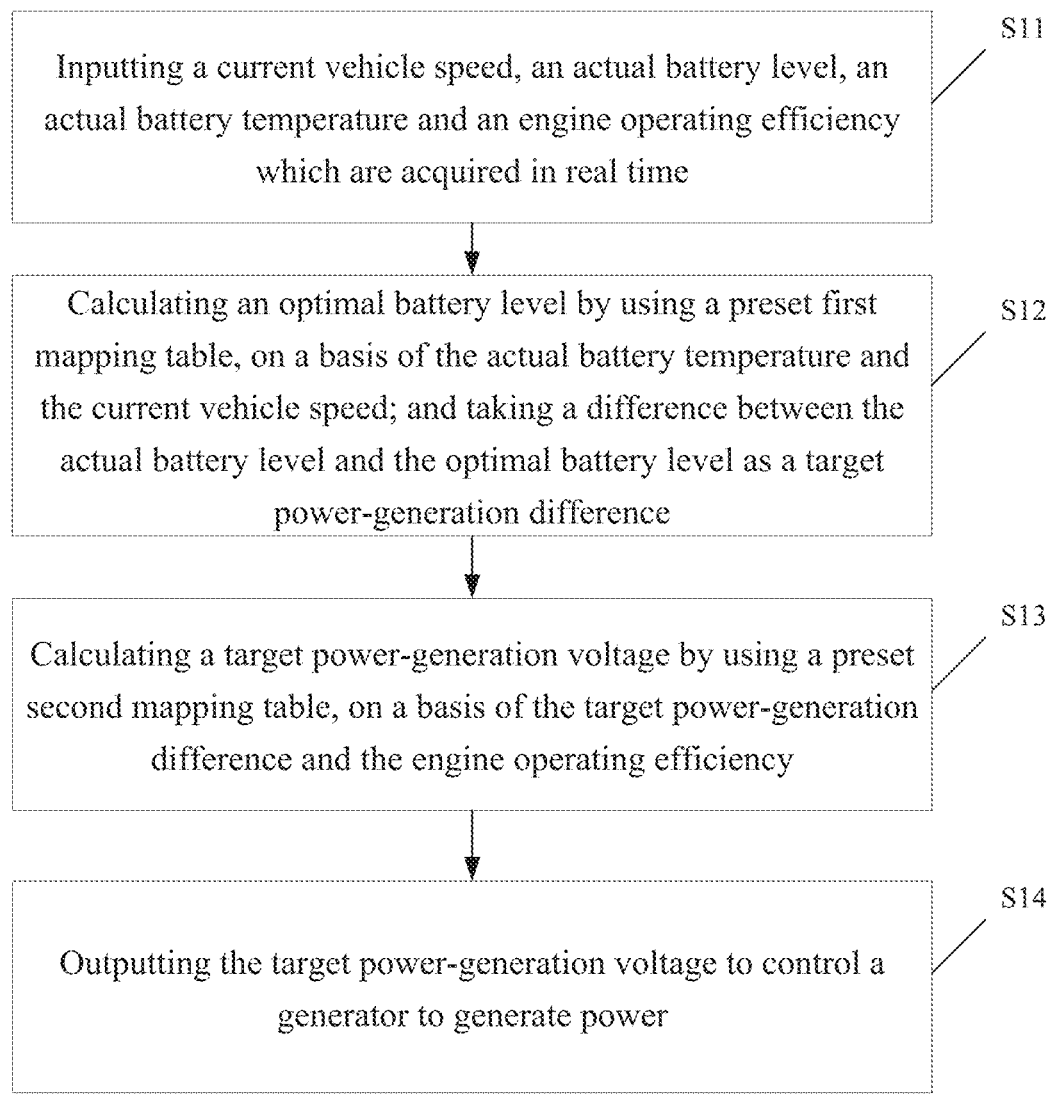
FIG. 1 is a flow diagram of an automotive generator control method according to a first embodiment of the present invention.

Referring to FIG. 1, it shows a flow diagram of an automotive generator control method according to a first embodiment of the present invention. Specifically, the automotive generator control method of the present invention is applicable to automotive electric systems which use rechargeable battery charged by a generator as main power supply unit in vehicle. During the vehicle operation, the rechargeable battery supplies power for electrical loads of the vehicle, and the states of the battery, the generator, and the vehicle can be detected in real time according to the automotive generator control method of the present invention, further the detected data will be calculated so as to control the generator to generate power, thereby charging the battery.

Specifically, the control method includes steps S11 to S14, as follow:

S11, inputting a current vehicle speed, an actual battery level, an actual battery temperature and an engine operating efficiency which are acquired in real time; specifically, the actual battery level and the actual battery temperature can be acquired by a battery sensor, and inputted by LIN bus, while the current vehicle speed and the engine operating efficiency can be obtained by common manners.

S12, calculating an optimal battery level by using a preset first mapping table, on a basis of the actual battery temperature and the current vehicle speed; and taking a difference between the actual battery level and the optimal battery level as a target power-generation difference.

Figure 2:
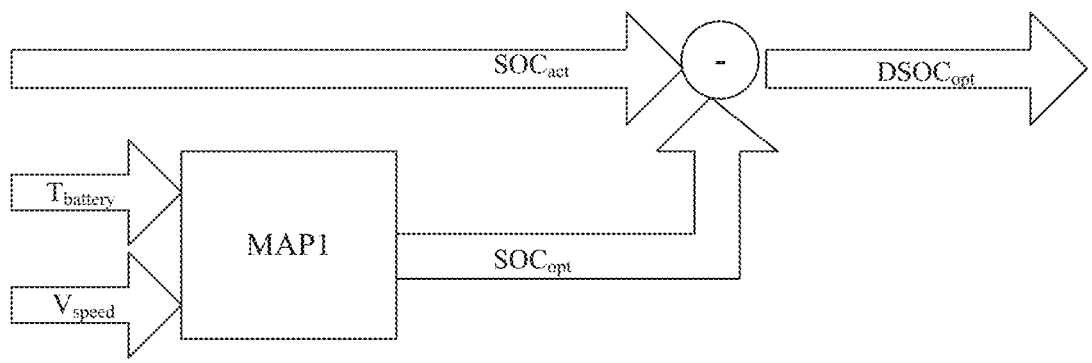
FIG. 2 is a computational logic diagram of step S12 in the automotive generator control method according to the first embodiment of the present invention.

Referring to FIG. 2, computational logic of the step is shown, specifically, $V_{speed}$ indicates the current vehicle speed, $T_{battery}$ indicates the actual battery temperature, $SOC_{act}$ indicates the actual battery level, $SOC_{opt}$ indicates the optimal battery level, $DSOC_{opt}$ indicates the target power-generation difference, and MAP1 indicates the first mapping table which is preset.

Figure 3:
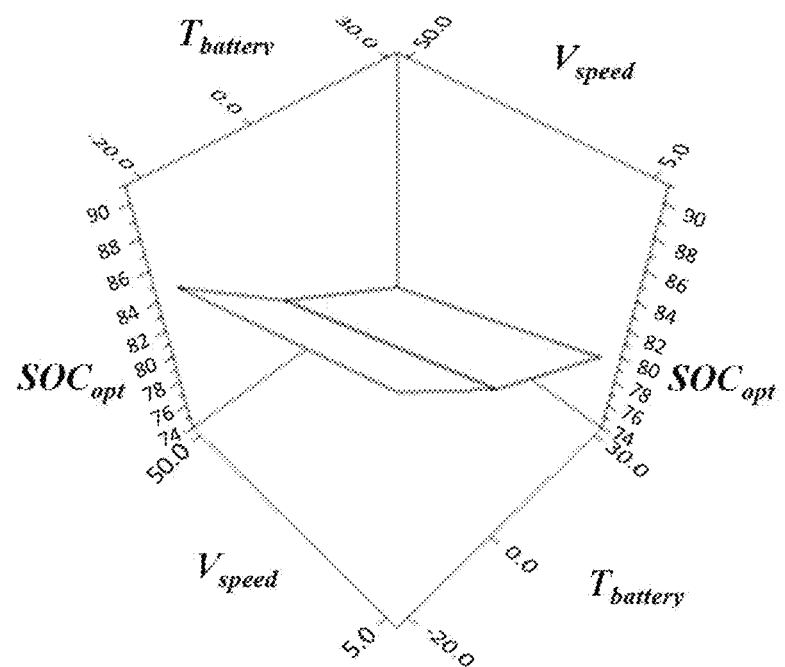
FIG. 3 is a diagram of a first mapping table MAP1 used in the automotive generator control method according to the first embodiment of the present invention.

In this embodiment, the first mapping table MAP1 is a MAP diagram from which the optimal battery level $SOC_{opt}$ can be determined, as shown in FIG. 3. As illustrated, the actual battery temperature $T_{battery}$ is indicated in x-coordinate, the current vehicle speed $V_{speed}$ is indicated in y-coordinate. According to physical characteristics of the battery, the optimal battery level of the battery has a downtrend varied as the actual battery temperature rising and/or the current vehicle speed increasing. Generally, the optimal battery level $SOC_{opt}$ is between 75%-90%.

Specifically, the actual battery temperature $T_{battery}$ and the current vehicle speed $V_{speed}$ are inputted to the MAP diagram MAP1, thereby outputting the optimal battery level $SOC_{opt}$; then difference between the actual battery level $SOC_{act}$ and the optimal battery level $SOC_{opt}$ is made to obtain a target power-generation difference $DSOC_{opt}$.

For further improving accuracy, before acquiring the actual battery level and the actual battery temperature, the battery sensor EBS is required to meet the accuracy demand for the states of the battery sensor. Specifically, the state accuracy of the battery sensor includes battery sensor level calculating accuracy $SOC_{state}$ and battery sensor voltage calculating accuracy $SOFV_{state}$, and the state accuracy of the battery sensor is adequate if the battery sensor level calculating accuracy $SOC_{state}$ is equal to 1 or 2 (therein 2 is the highest accuracy state), and the battery sensor voltage calculating accuracy $SOFV_{state}$ is equal to 1 or 2 (therein 2 is the highest accuracy state).

In this embodiment, the control method further includes taking a target power-generation difference replacement value that is preset as the target power-generation difference, that is, $DSOC_{opt}=DSOC_{set}$, once state accuracy of the battery sensor becomes poor (that is, the accuracy is inadequate) or failure is generated on the LIN bus or the battery sensor.

S13, calculating a target power-generation voltage by using a preset second mapping table, on a basis of the target power-generation difference and the engine operating efficiency.

Figure 4:
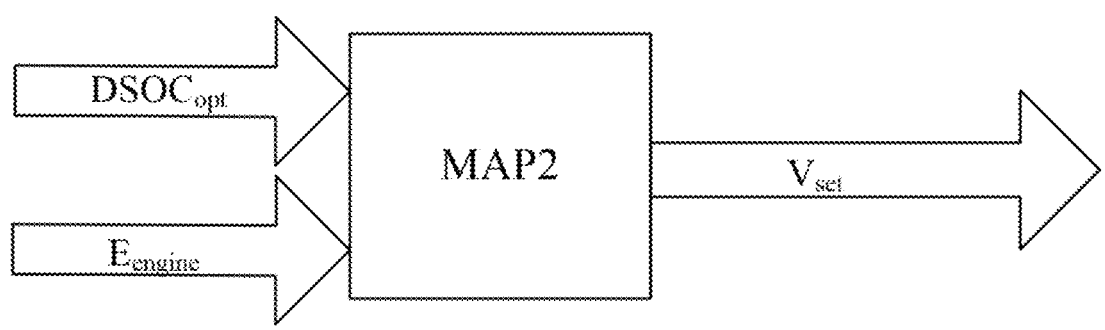
FIG. 4 is a computational logic diagram of step S13 in the automotive generator control method according to the first embodiment of the present invention.

Referring to FIG. 4, computational logic of the step is shown. As illustrated, $E_{engine}$ indicates the generator operating efficiency, $DSOC_{opt}$ indicates the target power-generation difference, $V_{set}$ indicates the target power-generation voltage, and MAP2 indicates the second mapping table which is preset.

Figure 5:
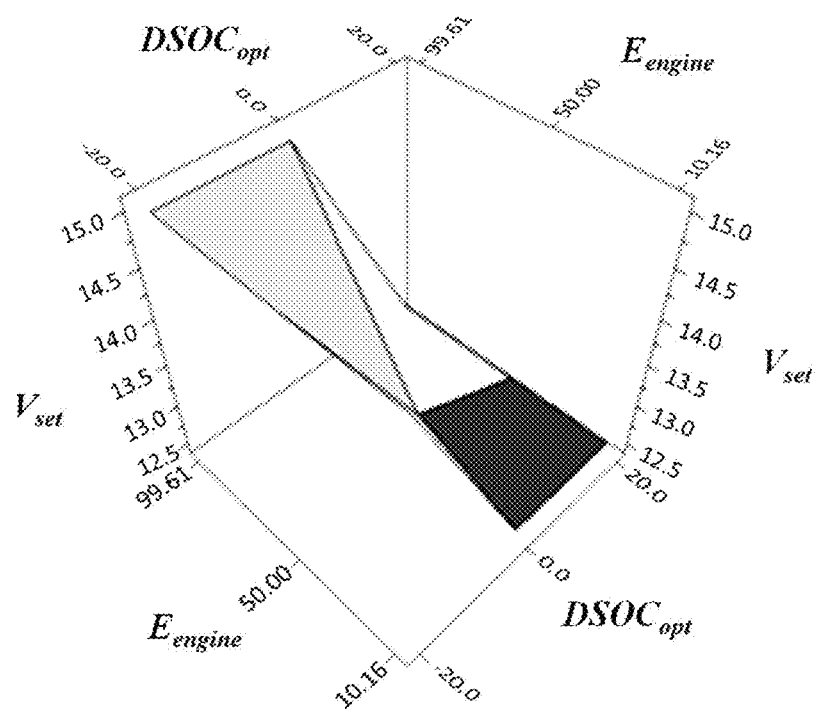
FIG. 5 is a diagram of a second mapping table MAP2 used in the automotive generator control method according to the first embodiment of the present invention.

In this embodiment, the second mapping table MAP2 is a MAP diagram from which the target power-generation voltage $V_{set}$ can be determined, as shown in FIG. 5. As illustrated, the target power-generation difference $DSOC_{opt}$ is indicated in x-coordinate, the generator operating efficiency $E_{engine}$ is indicated in y-coordinate. According to physical characteristics of the generator, the power-generation voltage of the generator has a downtrend varied as the target power-generation difference $DSOC_{opt}$ increasing, and has an uptrend varied as the generator operating efficiency $E_{engine}$ increasing. Generally, the target power-generation voltage is between 12.5V-15V.

Specifically, the target power-generation difference $DSOC_{opt}$ and the generator operating efficiency $E_{engine}$ are inputted to the MAP diagrams MAP2, thereby outputting the target power-generation voltage $V_{set}$.

S14, outputting the target power-generation voltage to control a generator to generate power.

Specifically, the target power-generation voltage $V_{set}$ will be sent to the generator as a control instruction, so that the generator will operate and charge the battery.

Figure 6:
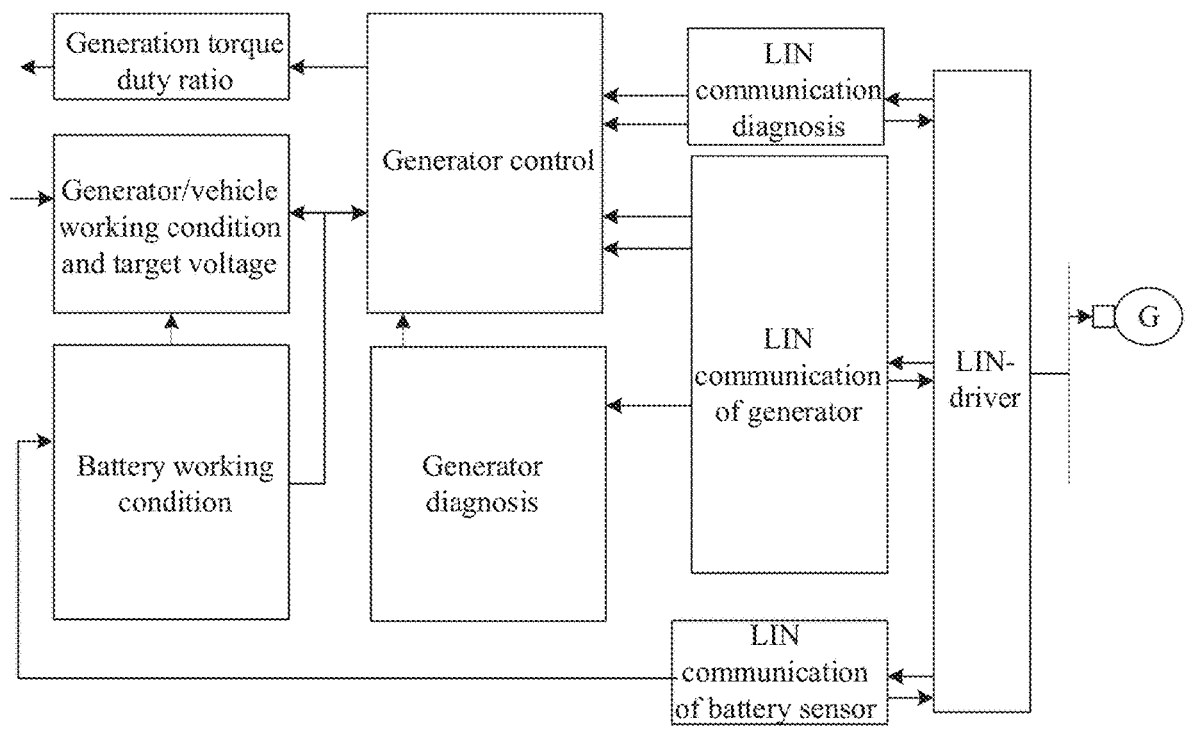
FIG. 6 is a control diagram showing the automotive generator control method on the basis of EMS, according to the first embodiment of the present invention.

Preferably, the automotive generator control method according to the present embodiment can be applicable to the current Engine Management System (EMS). FIG. 6 is a control diagram showing the automotive generator control method on the basis of EMS, according to the present invention.

By this token, the automotive generator control method according to the present invention acquires the optimal battery level on the basis of the actual battery temperature and the current vehicle speed which are acquired in real time, takes the difference between the actual battery level and the optimal battery level as the target power-generation difference, and then calculates the target power-generation voltage on the basis of the target power-generation difference and the engine operating efficiency, thereby controlling the generator; as a result, the power-generation voltage of intelligent generator can be efficiently controlled and adjusted on the basis of the current generator state, vehicle state, or battery state, so that energy consumption distribution management of the vehicle is optimized, primary energy recovery of the generator of the vehicle is efficiently achieved, and the lifetime of the battery is further extended.

Figure 7:
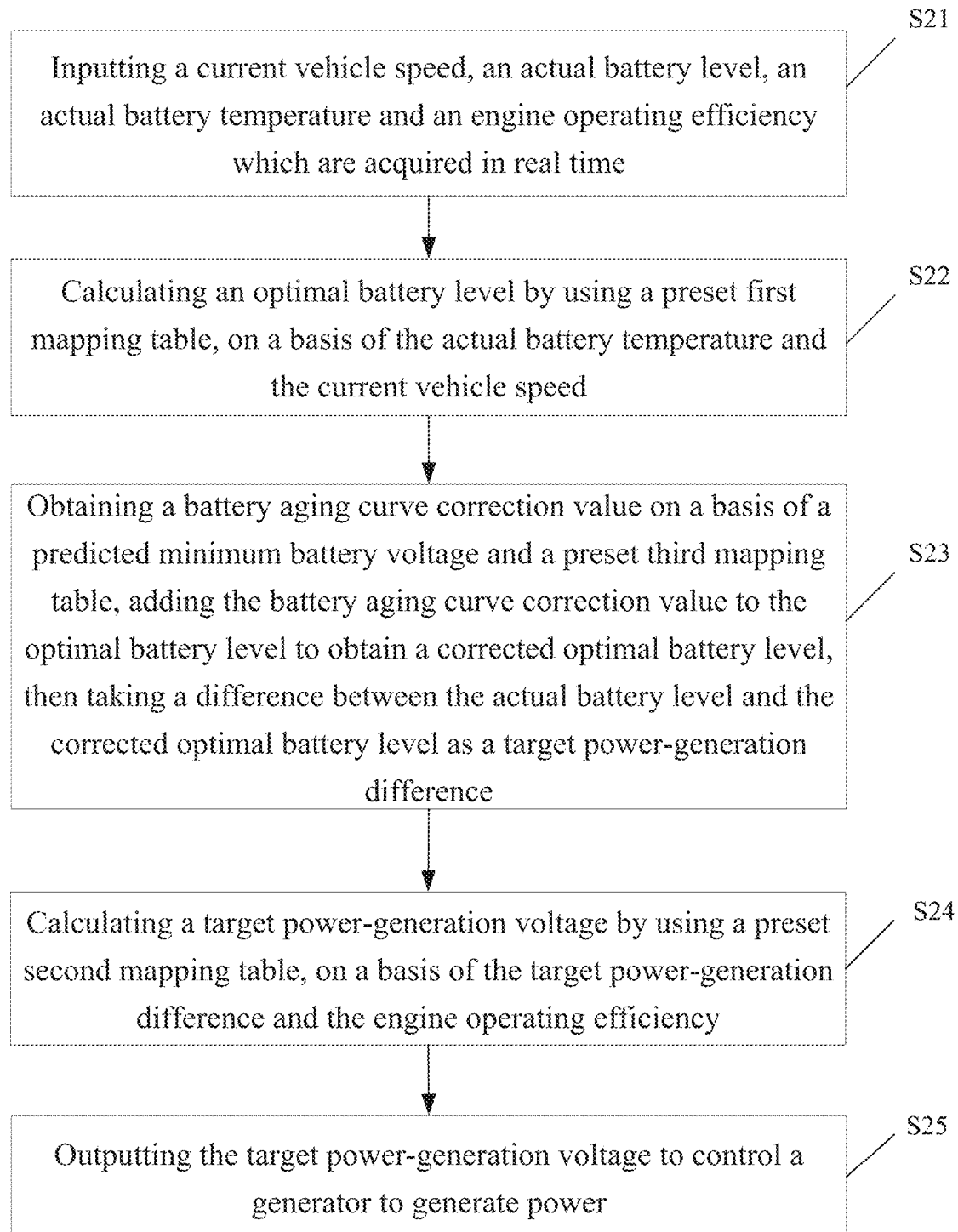
FIG. 7 is a flow diagram of an automotive generator control method according to a second embodiment of the present invention.

FIG. 7 is a flow diagram of an automotive generator control method according to a second embodiment of the present invention. The control method includes steps S21-S25, as follow:

S21, inputting a current vehicle speed, an actual battery level, an actual battery temperature and an engine operating efficiency which are acquired in real time;

S22, calculating an optimal battery level by using a preset first mapping table, on a basis of the actual battery temperature and the current vehicle speed;

S23, obtaining a battery aging curve correction value by using a preset third mapping table, on a basis of a predicted minimum battery voltage, adding the battery aging curve correction value to the optimal battery level to obtain a corrected optimal battery level, then taking a difference between the actual battery level and the corrected optimal battery level as a target power-generation difference;

S24, calculating a target power-generation voltage by using a preset second mapping table, on a basis of the target power-generation difference and the engine operating efficiency; and S25, outputting the target power-generation voltage to control a generator to generate power.

Figure 8:
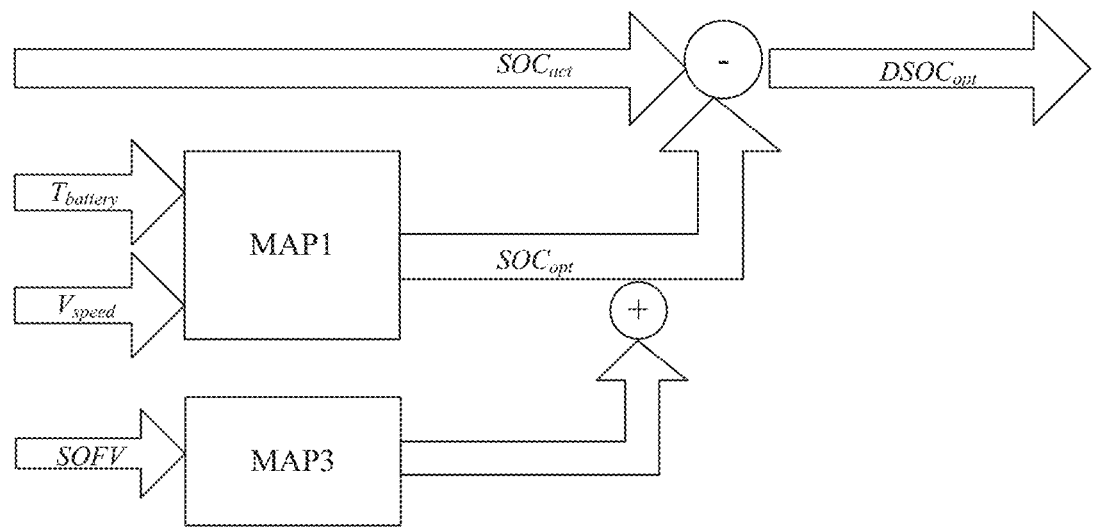
FIG. 8 is a computational logic diagram of step S23 in the automotive generator control method according to the second embodiment of the present invention.

Referring to FIG. 8, computational logic of the step is shown, specifically, $V_{speed}$ indicates the current vehicle speed, $T_{battery}$ indicates the actual battery temperature, $SOC_{act}$ indicates the actual battery level, $SOC_{opt}$ indicates the optimal battery level, $DSOC_{opt}$ indicates the target power-generation difference, MAP1 and MAP 2 respectively indicate the first mapping table and the second mapping table which are preset, and SOFV indicates predicted minimum battery voltage of the battery sensor EBS.

Based on the first embodiment, for improving the accuracy, the outputted optimal battery level $SOC_{opt}$ is corrected by battery aging curve correction method. Specifically, a battery aging curve correction value is obtained by using a preset third mapping table MAP3, on the basis of a predicted minimum battery voltage SOFV, and such a battery aging curve correction value is added to the optimal battery level $SOC_{opt}$ to obtain a corrected optimal battery level, finally, a difference between the actual battery level $SOC_{at}$ and the corrected optimal battery level $SOC_{opt}$ is token as the target power-generation difference $DSOC_{opt}$.

Figure 9:
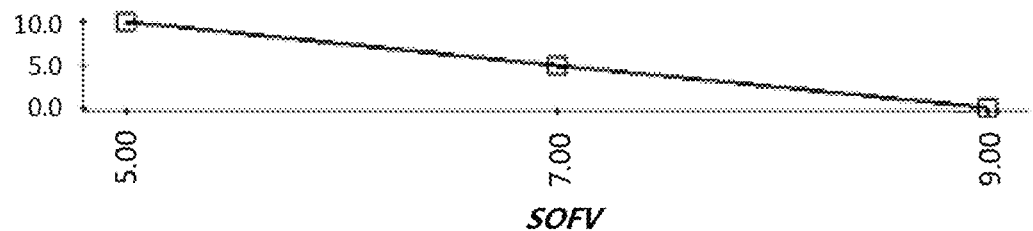
FIG. 9 is a diagram of a third mapping table MAP3 used in the automotive generator control method according to the second embodiment of the present invention.

Specifically, the third mapping table MAP3 is a curve correction diagram from which the battery aging curve correction value can be determined, as illustrated in FIG. 9. In the present embodiment, the actual battery level and the actual battery temperature can be acquired by the battery sensor EBS. In FIG. 9, the predicted minimum battery voltage SOFV is indicated in x-coordinate, and the battery aging curve correction value is indicated in y-coordinate.

In this embodiment, the optimal battery level $SOC_{opt}$ is corrected by battery aging curve correction method, and the corrected optimal battery level $SOC_{opt}$ will be inputted in the later step, thus the final outputted result will have higher accuracy.

In addition, the other steps of the present embodiment are same with that in the first embodiment, which are omitted here.

Figure 10:
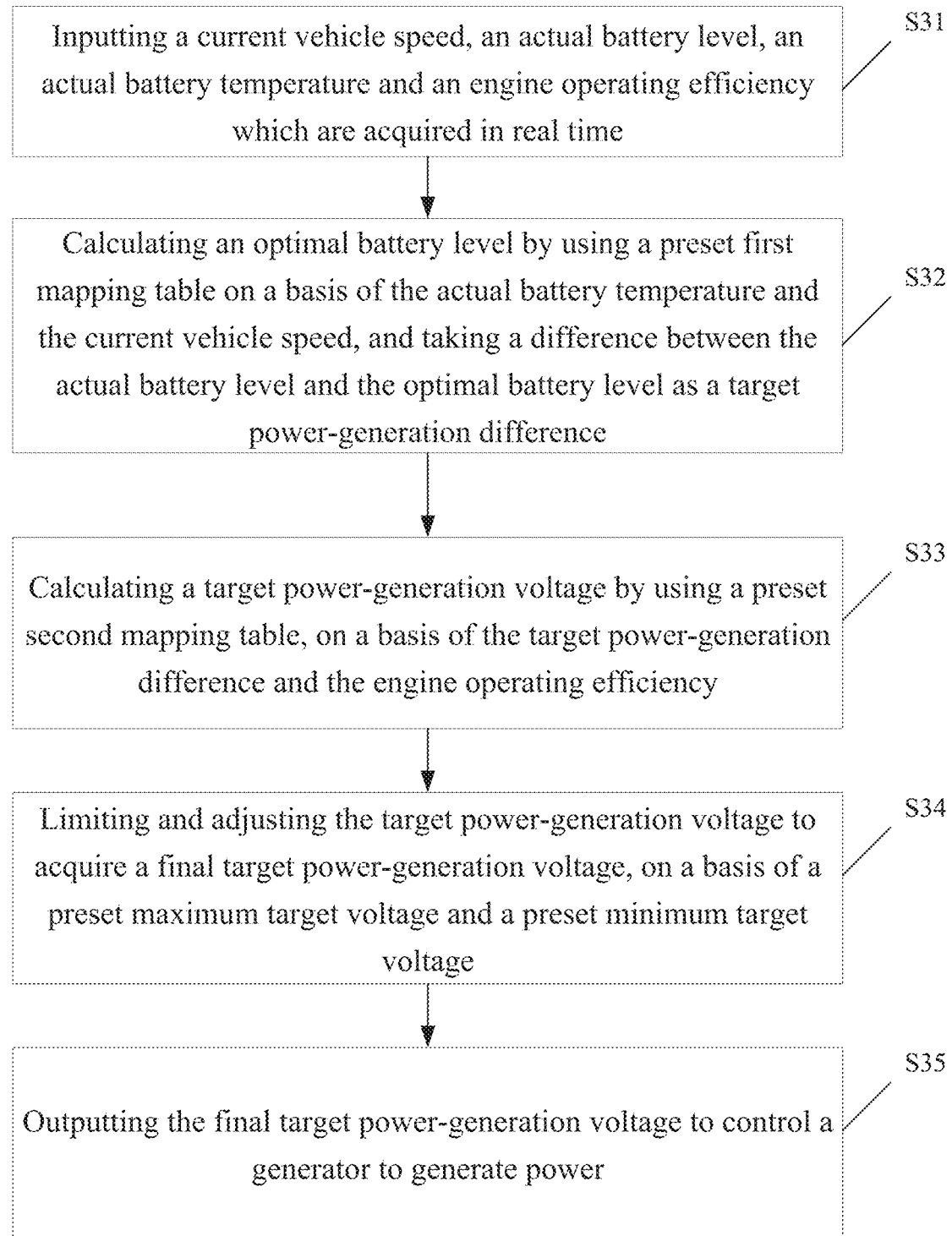
FIG. 10 is a flow diagram of an automotive generator control method according to a third embodiment of the present invention.

FIG. 10 is a flow diagram of an automotive generator control method according to a third embodiment of the present invention, and the control method includes steps S31-S35, as follow:

S31, inputting a current vehicle speed, an actual battery level, an actual battery temperature and an engine operating efficiency which are acquired in real time;

S32, calculating an optimal battery level by using a preset first mapping table on a basis of the actual battery temperature and the current vehicle speed, and taking a difference between the actual battery level and the optimal battery level as a target power-generation difference;

S33, calculating a target power-generation voltage by using a preset second mapping table, on a basis of the target power-generation difference and the engine operating efficiency;

S34, limiting and adjusting the target power-generation voltage to acquire a final target power-generation voltage, on a basis of a preset maximum target voltage and a preset minimum target voltage; and S35, outputting the final target power-generation voltage to control a generator to generate power.

Different from the first embodiment, the control method of the present embodiment adds the step of limiting and adjusting the target power-generation voltage so that the final target power-generation voltage is obtained, based on which the generator works.

Figure 11:
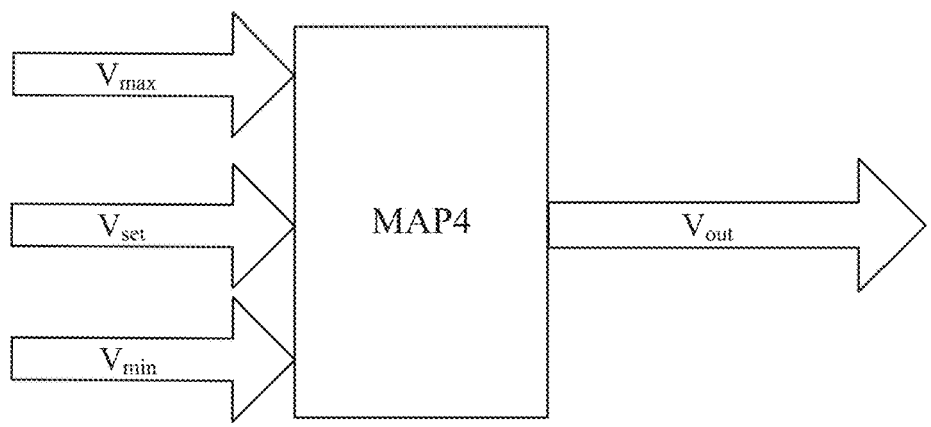
FIG. 11 is a computational logic diagram of step S34 in the automotive generator control method according to the third embodiment of the present invention.

Referring to FIG. 11, computational logic of the step is shown. As illustrated, $V_{set}$ indicates the target power-generation voltage, $V_{max}$ indicates the preset maximum target voltage, $V_{min}$ indicates the preset minimum target voltage, $V_{out}$ indicates the final target power-generation voltage, and MAP4 indicates limiting and adjusting formula which is preset.

Specifically, the final target power-generation voltage $V_{out}$ can be obtained by inputting the target power-generation voltage $V_{set}$, the preset maximum target voltage $V_{max}$ and the preset minimum target voltage $V_{min}$ into the limiting and adjusting formula MAP4.

By this token, the control accuracy of the generator is improved, since the target power-generation voltage $V_{set}$ is tuned.

In addition, the other steps of the present embodiment are same with that in the first embodiment, which are omitted here.

Figure 12:
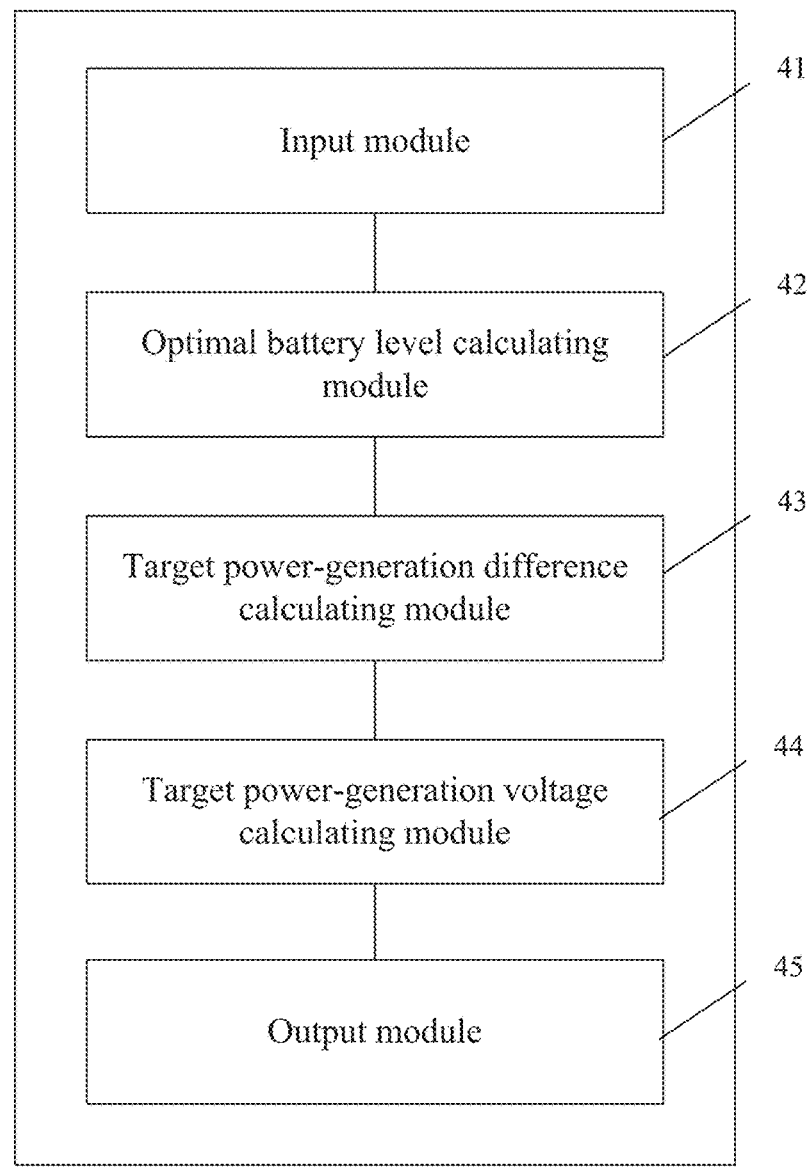
FIG. 12 is a structure diagram of an automotive generator control device according to a fourth embodiment of the present invention.

FIG. 12 is a structure diagram of an automotive generator control device according to a fourth embodiment of the present invention. The control device includes an input module 41, an optimal battery level calculating module 42, a target power-generation difference calculating module 43, a target power-generation voltage calculating module 44 and an output module 45.

Specifically, the input module 41 is arranged for inputting a current vehicle speed, an actual battery level, an actual battery temperature and an engine operating efficiency which are acquired in real time.

Preferably, the control device further includes a battery sensor module arranged for collecting the actual battery level and the actual battery temperature, and transmitting the actual battery level and the actual battery temperature to the input module 41 through a UN bus.

The optimal battery level calculating module 42 is arranged for calculating an optimal battery level by using a preset first mapping table (that is a MAP diagram to determine the optimal battery level), on a basis of the actual battery temperature and the current vehicle speed.

The target power-generation difference calculating module 43 is arranged for taking a difference between the actual battery level and the optimal battery level as a target power-generation difference.

Preferably, the target power-generation difference calculating module 43 further is arranged for taking a target power-generation difference replacement value that is preset as the target power-generation difference, once state accuracy of the battery sensor becomes poor (that is, the accuracy is inadequate) or failure is generated on the UN bus or the battery sensor.

Specifically, the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

The target power-generation voltage calculating module 44 is arranged for calculating a target power-generation voltage by using a preset second mapping table (that is a MAP diagram to determine the target power-generation voltage), on the basis of the target power-generation difference and the engine operating efficiency.

The output module 45 is arranged for outputting the target power-generation voltage to control the generator to generate power.

The realization process and the principle of the control device according to the present embodiment can be referred in the first embodiment, which are omitted here therefore.

Figure 13:
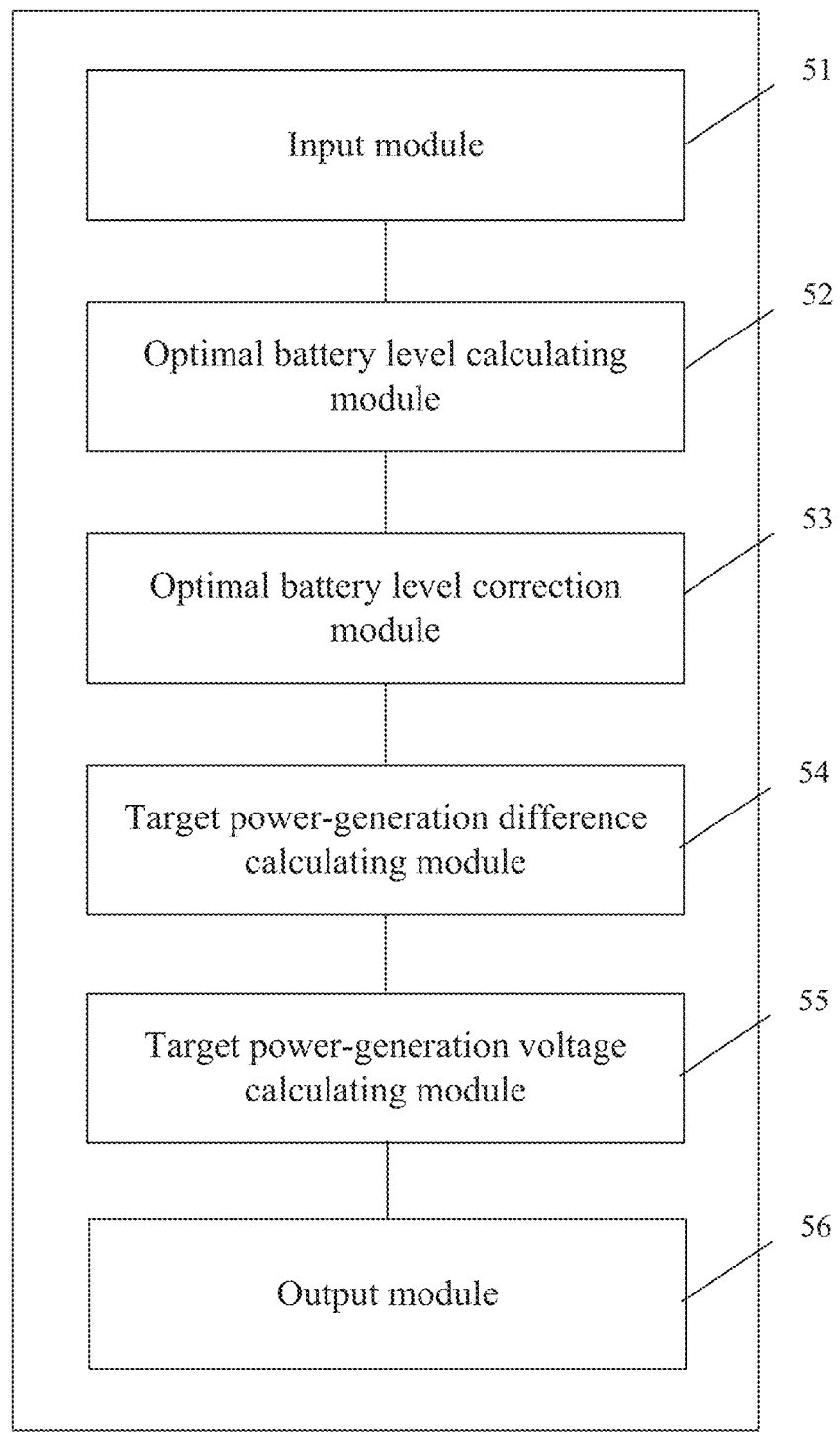
FIG. 13 is a structure diagram of an automotive generator control device according to a fifth embodiment of the present invention.

FIG. 13 is a structure diagram of an automotive generator control device according to a fifth embodiment of the present invention. The control device includes an input module 51, an optimal battery level calculating module 52, an optimal battery level correction module 53, a target power-generation difference calculating module 54, a target power-generation voltage calculating module 55 and an output module 56.

Specifically, the input module 51 is arranged for inputting a current vehicle speed, an actual battery level, an actual battery temperature and an engine operating efficiency which are acquired in real time.

Preferably, the control device further includes a battery sensor module arranged for collecting the actual battery level and the actual battery temperature, and transmitting the actual battery level and the actual battery temperature to the input module 51 through a LIN bus.

The optimal battery level calculating module 52 is arranged for calculating an optimal battery level by using a preset first mapping table (that is a MAP diagram to determine the optimal battery level), on the basis of the actual battery temperature and the current vehicle speed.

The optimal battery level correction module 53 is arranged for obtaining a battery aging curve correction value by using a preset third mapping table on a basis of a predicted minimum battery voltage, and adding the battery aging curve correction value to the optimal battery level to obtain a corrected optimal battery level.

The target power-generation difference calculating module 54 is arranged for taking a difference between the actual battery level and the optimal battery level as a target power-generation difference.

Preferably, the target power-generation difference calculating module 54 is further arranged for taking a target power-generation difference replacement value that is preset as the target power-generation difference, once the state accuracy of the battery sensor becomes poor or failure is generated on the LIN bus or the battery sensor.

Specifically, the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

The target power-generation voltage calculating module 55 is arranged for calculating a target power-generation voltage by using a preset second mapping table (that is a MAP diagram to determine the target power-generation voltage), on the basis of the target power-generation difference and the engine operating efficiency.

The output module 56 is arranged for outputting the target power-generation voltage to control the generator to generate power.

The realization process and the principle of the control device according to the present embodiment can be referred in the second embodiment, which are omitted here therefore.

Figure 14:
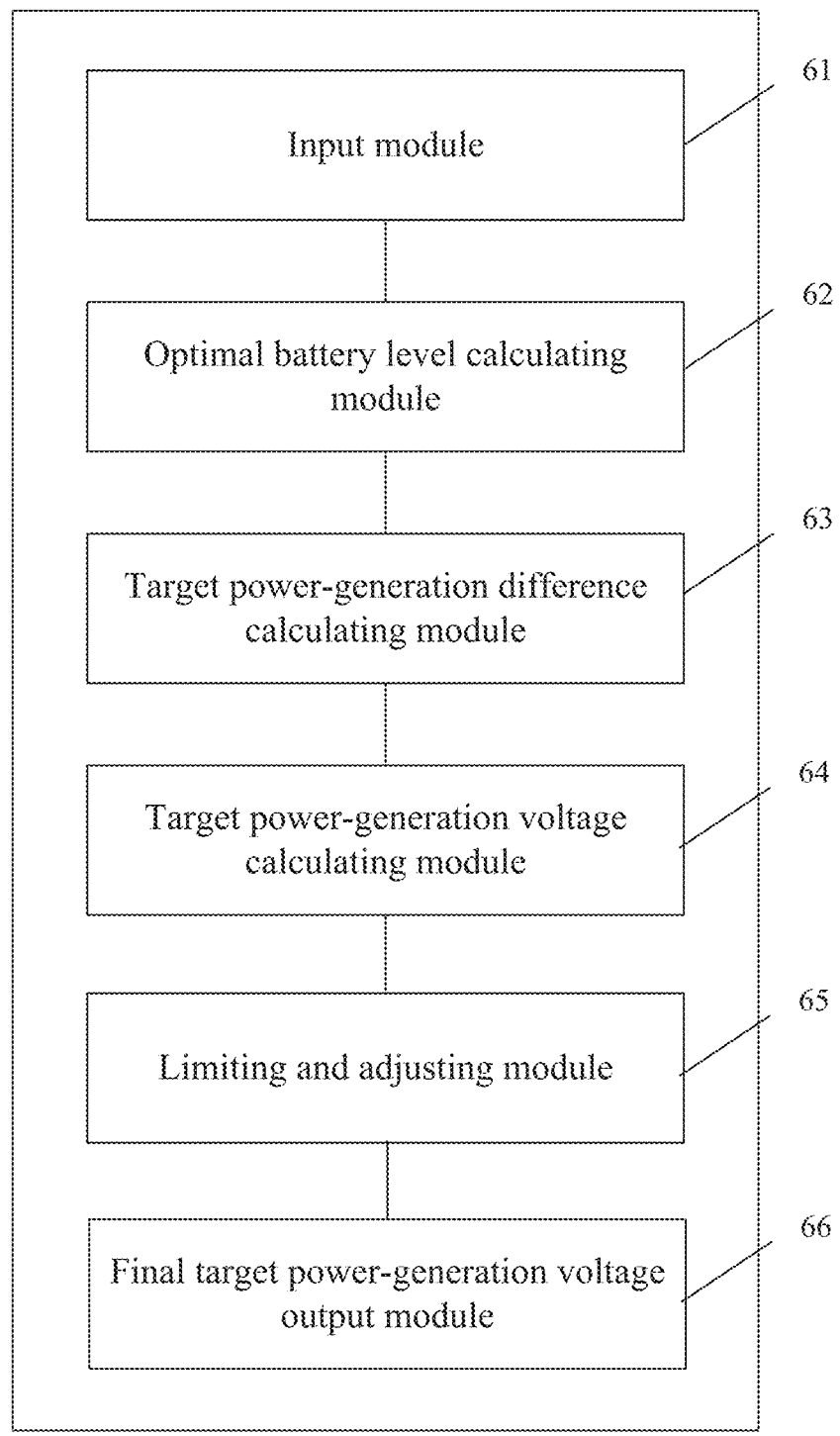
FIG. 14 is a structure diagram of an automotive generator control device according to a sixth embodiment of the present invention.

FIG. 14 is a structure diagram of an automotive generator control device according to a sixth embodiment of the present invention. The control device includes an input module 61, an optimal battery level calculating module 62, a target power-generation difference calculating module 63, a target power-generation voltage calculating module 64, a limiting and adjusting module 65 and a final target power-generation voltage output module 66.

Specifically, the input module 61 is arranged for inputting a current vehicle speed, an actual battery level, an actual battery temperature and an engine operating efficiency which are acquired in real time.

Preferably, the control device further includes a battery sensor module arranged for collecting the actual battery level and the actual battery temperature, and transmitting the actual battery level and the actual battery temperature to the input module 61 through a UN bus.

The optimal battery level calculating module 62 is arranged for calculating an optimal battery level by using a preset first mapping table (that is a MAP diagram to determine the optimal battery level), on the basis of the actual battery temperature and the current vehicle speed.

The target power-generation difference calculating module 63 is arranged for taking a difference between the actual battery level and the optimal battery level as a target power-generation difference.

Preferably, the target power-generation difference calculating module 63 is further arranged for taking a target power-generation difference replacement value that is preset as the target power-generation difference, once the state accuracy of the battery sensor becomes poor or failure is generated on the UN bus or the battery sensor.

Specifically, the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

The target power-generation voltage calculating module 64 is arranged for calculating a target power-generation voltage by using a preset second mapping table (that is a MAP diagram to determine the target power-generation voltage), on a basis of the target power-generation difference and the engine operating efficiency.

The limiting and adjusting module 65 is arranged for limiting and adjusting the target power-generation voltage, on the basis of a preset maximum target voltage and a preset minimum target voltage, thereby obtaining a final target power-generation voltage.

The final target power-generation voltage output module 66 is arranged for outputting the final target power-generation voltage to control the generator to generate power.

The realization process and the principle of the control device according to the present embodiment can be referred in the third embodiment, which are omitted here therefore.

In conclusion, the automotive generator control method and the control device according to the present invention acquires the optimal battery level on the basis of the actual battery temperature and the current vehicle speed which are acquired in real time, takes the difference between the actual battery level and the optimal battery level as the target power-generation difference, and then calculates the target power-generation voltage on the basis of the target power-generation difference and the engine operating efficiency, thereby controlling the generator; as a result, the power-generation voltage of intelligent generator can be efficiently controlled and adjusted on the basis of the current engine/vehicle working condition and the battery working condition, so that energy consumption distribution management of the vehicle is optimized, primary energy recovery of the generator of the vehicle is efficiently achieved, and the lifetime of the battery is further extended. Moreover, the power-generation voltage of the intelligent generator is controlled accurately, thereby the accuracy of the generator is improved.

While the invention has been described in connection with what are presently considered to be the most practical and preferable embodiments, it is to be understood that the invention is not to be limited to the disclosed embodiments, but on the contrary, is intended to cover various modifications and equivalent arrangements included within the spirit and scope of the invention.

What is claimed is:

1. An automotive generator control method, comprising:
   inputting a current vehicle speed, an actual battery level, an actual battery temperature and an engine operating efficiency which are acquired in real time;
   calculating an optimal battery level by using a preset first mapping table, on a basis of the actual battery temperature and the current vehicle speed;
   taking a difference between the actual battery level and the optimal battery level as a target power-generation difference;
   calculating a target power-generation voltage by using a preset second mapping table, on a basis of the target power-generation difference and the engine operating efficiency; and
   outputting the target power-generation voltage to control a generator to generate power.

2. The automotive generator control method according to claim 1, further comprising:
   obtaining a battery aging curve correction value by using a preset third mapping table, on a basis of a predicted minimum battery voltage; and adding the battery aging curve correction value to the optimal battery level to obtain a corrected optimal battery level;

wherein said taking a difference between the actual battery level and the optimal battery level as a target power-generation difference comprises:

taking a difference between the actual battery level and the corrected optimal battery level as a target power-generation difference.

3. The automotive generator control method according to claim 1, wherein said outputting the target power-generation voltage to control a generator to generate power comprises:

limiting and adjusting the target power-generation voltage to acquire a final target power-generation voltage, on a basis of a preset maximum target voltage and a preset minimum target voltage; and outputting the final target power-generation voltage to control the generator to generate power.

4. The automotive generator control method according to claim 1, wherein the actual battery level and the actual battery temperature are acquired by a battery sensor and inputted through a UN bus.

5. The automotive generator control method according to claim 4, further comprising:

taking a target power-generation difference replacement value that is preset as the target power-generation difference, once state accuracy of the battery sensor becomes poor or failure is generated on the UN bus or the battery sensor.

6. The automotive generator control method according to claim 5, wherein the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

7. The automotive generator control method according to claim 1, wherein the first mapping table and the second mapping table are MAP diagrams.

8. An automotive generator control device, comprising:

an input module, arranged for inputting a current vehicle speed, an actual battery level, an actual battery temperature and an engine operating efficiency which are acquired in real time;

an optimal battery level calculating module, arranged for calculating an optimal battery level by using a preset first mapping table, on a basis of the actual battery temperature and the current vehicle speed;

a target power-generation difference calculating module, arranged for taking a difference between the actual battery level and the optimal battery level as a target power-generation difference;

a target power-generation voltage calculating module, arranged for calculating a target power-generation voltage by using a preset second mapping table, on a basis of the target power-generation difference and the engine operating efficiency; and an output module, arranged for outputting the target power-generation voltage to control a generator to generate power.

9. The automotive generator control device according to claim 8, further comprising:

an optimal battery level correction module, arranged for obtaining a battery aging curve correction value by using a preset third mapping table, on a basis of a predicted minimum battery voltage, and adding the battery aging curve correction value to the optimal battery level to obtain a corrected optimal battery level;

wherein the target power-generation voltage calculating module is arranged for taking a difference between the actual battery level and the corrected optimal battery level as a target power-generation difference.

10. The automotive generator control device according to claim 8, wherein the output module comprises:

a limiting and adjusting module, arranged for limiting and adjusting the target power-generation voltage, on a basis of a preset maximum target voltage and a preset minimum target voltage, thereby obtaining a final target power-generation voltage; and a final target power-generation voltage output module, arranged for outputting the final target power-generation voltage to control the generator to generate power.

11. The automotive generator control device according to claim 8, further comprising a battery sensor module arranged for collecting the actual battery level and the actual battery temperature, and transmitting the actual battery level and the actual battery temperature to the input module through a UN bus.

12. The automotive generator control device according to claim 11, wherein the target power-generation voltage output module is further arranged for taking a target power-generation difference replacement value that is preset as the target power-generation difference, once state accuracy of the battery sensor becomes poor or failure is generated on the UN bus or the battery sensor.

13. The automotive generator control device according to claim 11, wherein the state accuracy of the battery sensor includes battery sensor level calculating accuracy and battery sensor voltage calculating accuracy, and the state accuracy of the battery sensor is adequate if the battery sensor level calculating accuracy is equal to 1 or 2, and the battery sensor voltage calculating accuracy is equal to 1 or 2.

14. The automotive generator control device according to claim 8, wherein the first mapping table and the second mapping table are MAP diagrams.

* * * * *